United States Patent [19]

Sauer et al.

[11] 4,103,580

[45] Aug. 1, 1978

[54] DIE BOARDS AND METHOD OF PRODUCING CUTTING RULE FOR SAME

[75] Inventors: Louis E. Sauer; Orville C. Miller, both of St. Louis, Mo.

[73] Assignee: L.E. Sauer Machine Co., St. Louis, Mo.

[21] Appl. No.: 483,530

[22] Filed: Jun. 27, 1974

Related U.S. Application Data

[60] Continuation of Ser. No. 318,220, Dec. 26, 1972, abandoned, which is a continuation-in-part of Ser. No. 184,248, Sep. 27, 1971, abandoned, which is a division of Ser. No. 840,384, Jul. 9, 1969, Pat. No. 3,696,480.

[51] Int. Cl.$^2$ ............................................. B26F 1/44
[52] U.S. Cl. ........................................ 83/663; 83/698
[58] Field of Search ................ 83/669, 670, 663, 673, 83/674, 675, 698; 76/107 C

[56] References Cited

U.S. PATENT DOCUMENTS

| | | | |
|---|---|---|---|
| 3,170,358 | 2/1965 | Martin | 83/673 |
| 3,250,152 | 5/1966 | Kirby et al. | 76/107 C |
| 3,260,159 | 7/1966 | Dovey | 83/669 X |
| 3,289,516 | 12/1966 | Bohrer et al. | 83/698 X |

*Primary Examiner*—J. M. Meister
*Attorney, Agent, or Firm*—Rogers, Eilers & Howell

[57] ABSTRACT

There is disclosed a method of and apparatus for developing on tape and applying a pre-selected die design, etc., defined by spaced drilled holes, to a die board automatically by a tape controlled apparatus, and to automatically produce properly dimensioned cutting rule for the design. A computer is programmed to produce information which is transferred to a tape, or the like, fed to a numerical control machine to energize selected mechanisms to physically apply a pre-selected design formed by spaced drilled holes, routing, etc., to a die board for reception of spaced tangs or legs of cutting rule, or the like, or other workings. The information from the computer also is utilized, by means of an intermediate tape or the like, to energize a numerically controlled cutting rule machine to automatically produce cutting rule segments of the proper number and length for mounting in the drilled design on the cutting board. Included in the computer programming is a foreshortening of dimensions, if required, to compensate for the relative position of the cutting rule edge in arcuate die boards. Illustrated is an exemplary apparatus for punching cutting rule and for drilling or drilling and routing rotary die board including an electrically actuatable structure for rotatably supporting rotary die board, an electrically actuatable traversable supporting structure for a drill head, and an electrically actuatable drill head adapted to execute desired reciprocable movements and to drill spaced holes and to rout, as signalled.

2 Claims, 19 Drawing Figures

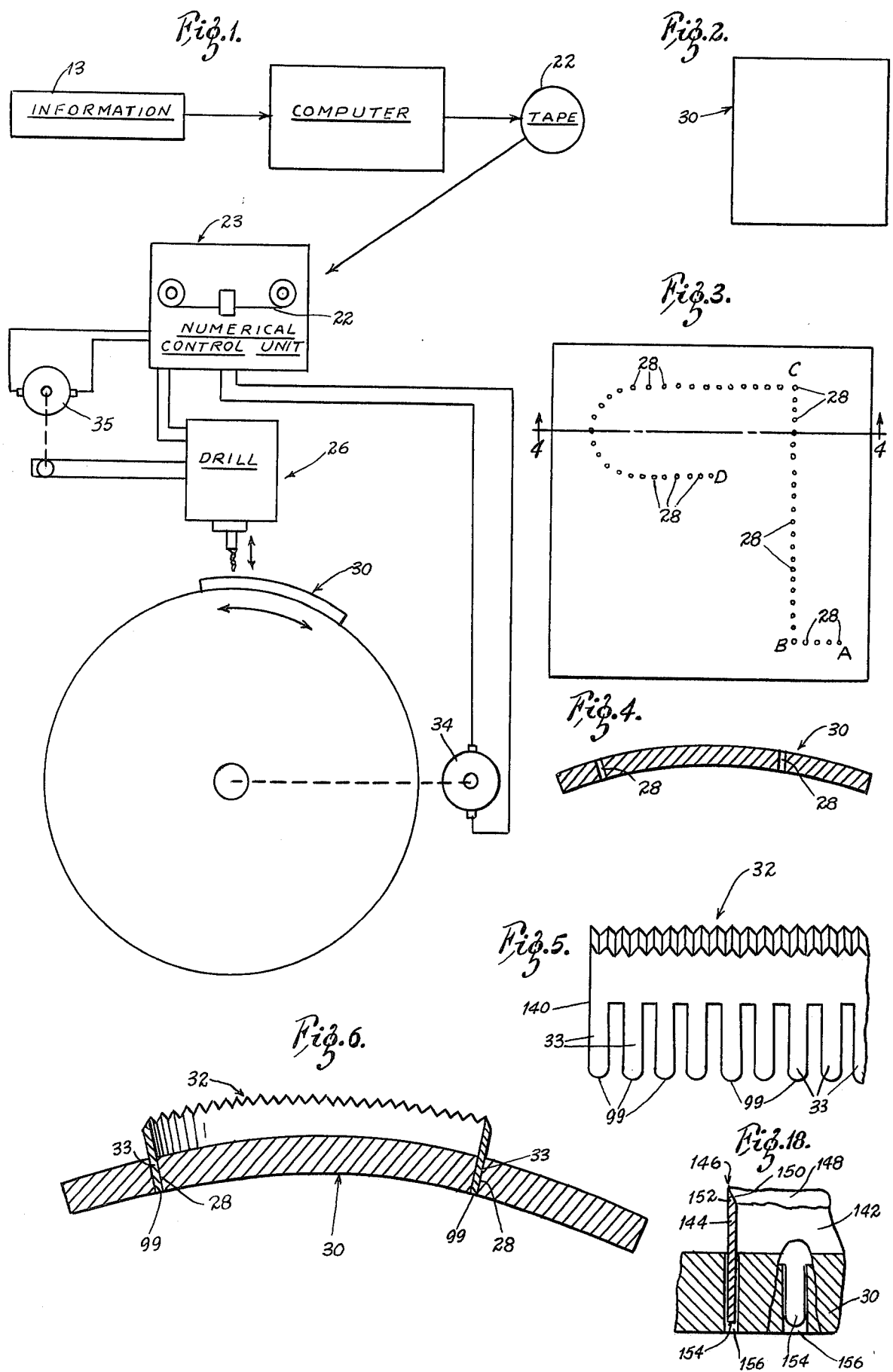

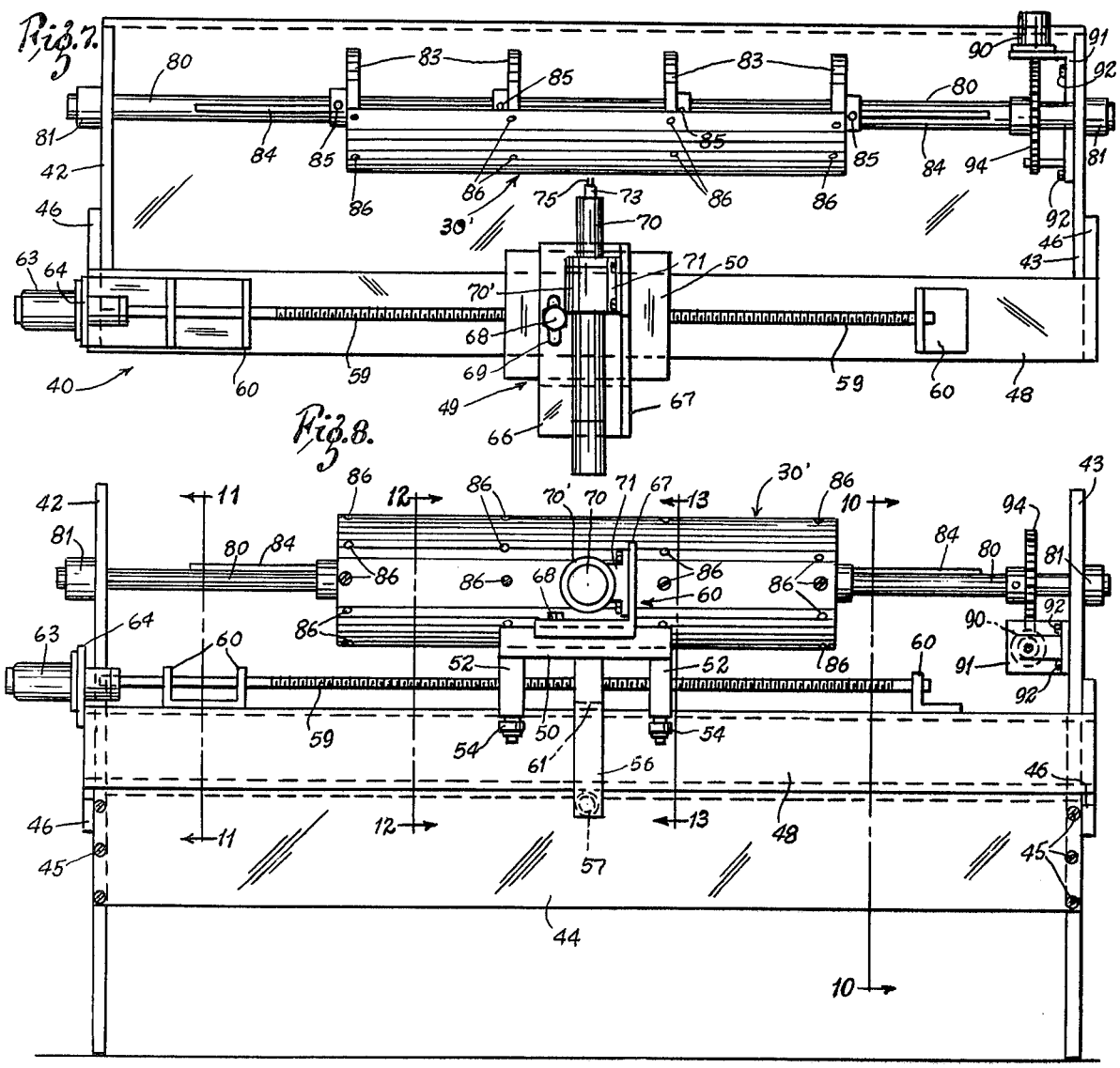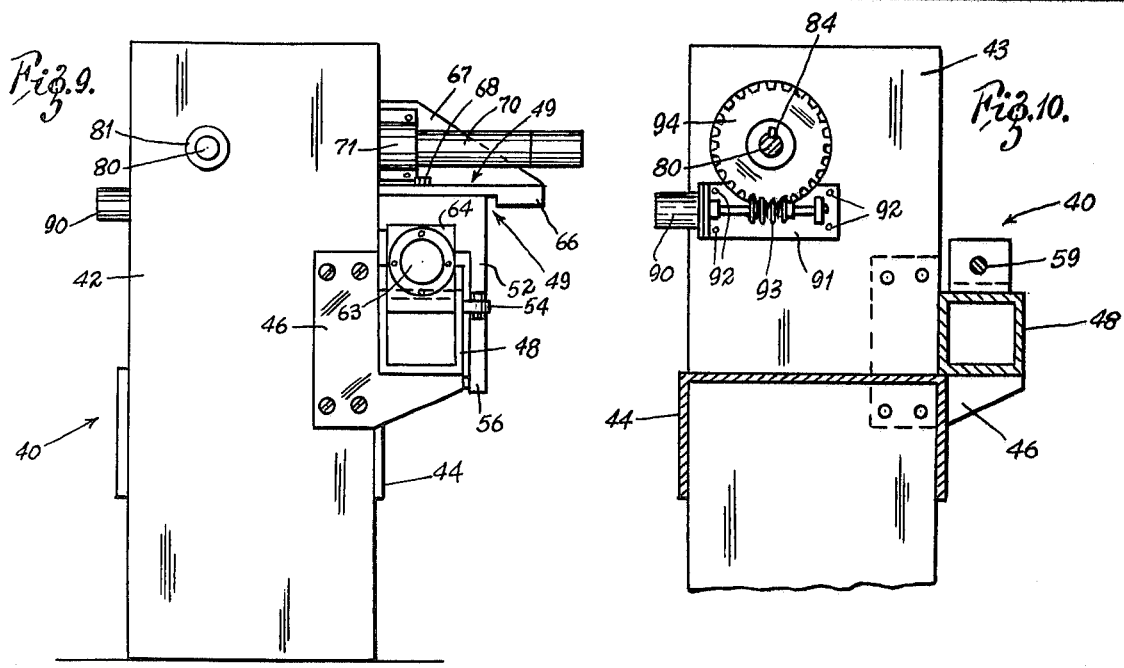

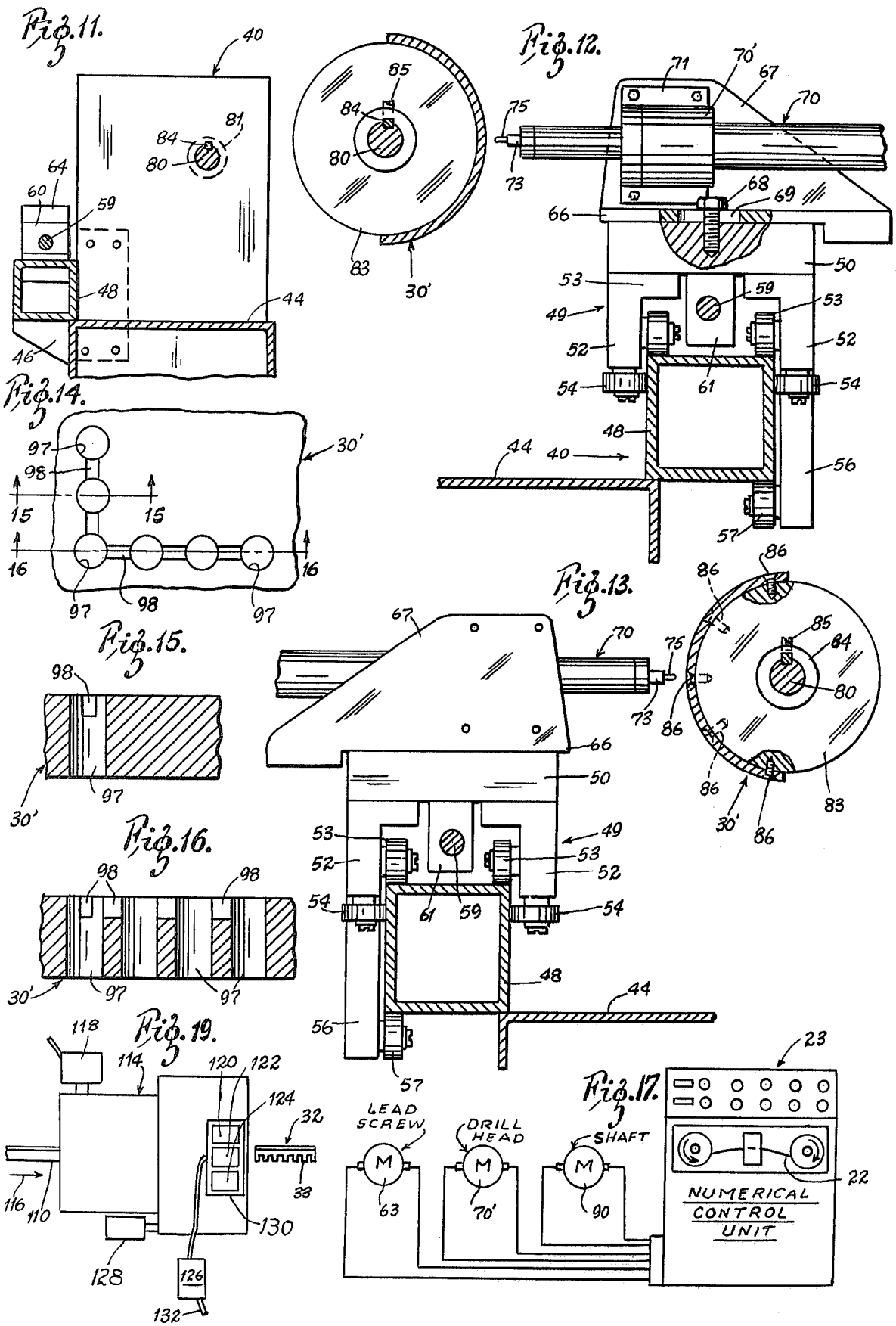

DIE BOARDS AND METHOD OF PRODUCING CUTTING RULE FOR SAME

This application is a continuation of application Ser. No. 318,220, filed Dec. 26, 1972, now abandoned, which is a continuation-in-part of application Ser. No. 184,248, filed Sept. 27, 1971, now abandoned, which was a division of application Ser. No. 840,384, filed July 9, 1969, now U.S. Pat. No. 3,696,480.

BACKGROUND OF THE INVENTION

1. Field of the Invention

The present invention relates generally to the die cutting art, and more particularly to extremely accurately worked die boards and a method and apparatus for automatically producing segment of cutting rule for reception by the board.

2. Description of the Prior Art

In the prior art, there are many ways and means for making dies, both flat and rotary. With particular reference to rotary dies, one method is to saw cuts in cylindrical pieces of plywood or other die material with a jig or saber-type saw, leaving ties at selected intervals, and driving cutting rule into the saw cuts. Another method is to hold the cutting rule in place by clampling blocks which are fastened to an appropriately curved piece of die material forming a sub-base. A third method is to fasten the cutting rule to the edges of blocks which are, in turn, fastened to a suitable die base. Many other methods and apparatus exist, or have been tried in the past and relegated to limbo.

A single die cutting board must often bear two or more identical cutting rule designs for cutting out two or more identical designs simultaneously from a sheet of feed stock. Identity, or even approximate identity, between die designs can be achieved only at great expense in time and money.

SUMMARY OF THE INVENTION

Briefly, the present invention relates to a system for automatic production of cutting rule segments having supporting tangs and adapted in number and length for reception in a die board having spaced holes therein defining a pre-determined design and adapted to receive the tangs of the cutting rule. This system comprises means for developing data for the pre-determined die design adapted to be converted to a punched tape or the like, means for converting the developed data into the punched tape or the like, means responsive to the punched tape for producing electrical impulses, and means responsive to the electrical impulses for producing the cutting rule segments from a continuous length of cutting rule blank. The mechanism includes means for advancing cutting rule therethrough and means for severing cutting rule segments from the continuous length of cutting rule blank.

In the preferred embodiment, the system of the invention includes die-working means adapted to physically apply the preselected design to a die board in the form of spaced holes in response to the electrical impulses derived by the punched tape or the like and adapted to receive the tangs of the cutting rule segments produced as aforesaid.

In another embodiment, the invention relates to a die board comprising a body, and spaced holes in the body defining a pre-selected design, the holes being adapted to receive spaced tangs of cutting rule. The die board preferably includes routing between the holes adapted to snugly receive die rule to accurately position the same.

Broadly, data derived from a pre-selected design for which die board is desired is fed into a computer suitably programmed to produce a control tape which is then fed to mechanism actuatable by the tape to give electrical signals or impulses. Such impulses serve as input to means for producing cutting rule segments and, preferably, means for physically applying the pre-selected design to a die board in the form of spaced holes. The cutting rule segments thus produced are adapted in number and length for reception of the tangs thereof into the spaced holes. Thus, the present invention automatically provides the correct cutting rule segments for mounting in die boards having spaced holes therein defining pre-selected designs, thereby avoiding the heretofore time-consuming job of manually making cutting rule segments. In the preferred embodiment, which includes means for physically applying the pre-selected design to a die board in the form of spaced holes in response to the electrical impulses derived from the punched tape or the like, the die working means includes a support for the die board, an electrically actuatable drill head adapted to function as required, and electrically actuatable positioning means for relatively positioning the drill head and the die board so that accurately-located, spaced holes may be drilled in the latter.

Therefore it is an object of the present invention to provide a novel method of and apparatus for the automatic production of cutting rule segments for reception in spaced holes defining a pre-selected design in a die board.

Another object of the invention is to provide a novel method and apparatus for reproducing highly accurate die designs on successive or the same die board in the form of spaced holes and for automatically producing cutting rule segments having depending tangs and adapted in number and length for reception in the spaced holes.

A further object is to provide a novel die board incorporating a design or designs defined by spaced holes therein.

BRIEF DESCRIPTION OF THE DRAWINGS

FIG. 1 is a diagrammatic layout of apparatus for developing a predetermined design for a die on tape and automatically accurately translating such design through said tape to a die board or base, said design being foreshortened, as required, in the direction of rotation to properly locate cutting rule in the case of a rotary die board;

FIG. 2 is a plan view of an arcuate die board prior to drilling;

FIG. 3 is an enlarged plan view of a novel arcuate die board having holes therein to receive tangs or legs of cutting rule prepared in accordance with the teachings of the present invention;

FIG. 4 is a vertical cross-sectional view taken on substantially the line 4—4 of FIG. 3;

FIG. 5 is a side elevational view of a fragment of cutting rule having spacing tangs or legs made in accordance with the present invention, FIG. 6 is an enlarged view similar to FIG. 4 with a cutting rule like that of FIG. 5 mounted therein;

FIG. 7 is a plan view of one embodiment of apparatus for tape controlled drilling, or combined drilling and routing, of rotary die boards in carrying out the present invention;

FIG. 8 is a side elevational view thereof;

FIG. 9 is an end elevational view thereof looking from left to right in FIG. 8;

FIGS. 10, 11, 12 and 13 are vertical transverse, cross-sectional views taken on substantially the lines 10-10, 11-11, 12—12 and 13—13 of FIG. 8, respectively, FIGS. 12 and 13 being on a larger scale;

FIG. 14 is a view of a fragment of a novel die board for cutting rule illustrating a simple drilled and routed pattern;

FIGS. 15 and 16 are radial axial cross-sectional views taken on substantially the lines 15—15 and 16—16, respectively, of FIG. 14;

FIG. 17 is a diagrammatic wiring diagram for actuation of the apparatus of FIG. 1 by a tape controlled unit.

FIG. 18 represents abutting ends of cutting rule segment portions produced by the present invention, shown partially in cross-section; and FIG. 19 is a diagrammatic representation of an apparatus for working lengths of cutting rule blank according to the present invention.

DESCRIPTION OF THE PREFERRED EMBODIMENT

Referring to the drawings more particularly by reference numerals and initially considering FIGS. 1-6, in FIG. 1 the present novel method of and apparatus for applying designs, etc., to rotary die boards in structure and layout for receiving cutting rule are diagrammatically illustrated as to basic concepts, rotary, or arcuate die boards being exemplified. Information 18 covering the required design is fed into a properly programmed computer 19, which translates the information and produces a tape 22. The tape 22 can be made, of course, other than by computer, such as the programming procedure recommended and published by the Superior Electric Company, Bristol, Connecticut, for its SLO-SYN Numerical Tape Control. A numerical control unit 23 receives the tape 22 and translates the information thereon to the necessary electrical impulses to actuate electrical elements in accordance therewith. Such impulses may energize a traversing supported drill head 26 to automatically drill sequential holes 28 in a rotatively supported arcuate base or die board 30 and cooperatively energize a motor 34 operatively connected to rotate the die board 30 support and a motor 35 operatively connected to the drill head 26 support for traversing the drill head 26. Routing by the drill head 26 may be included. Spacings connecting holes 28 not on the axis of rotation of the die board 30 are foreshortened in the direction of rotation of the die board 30, as required, this important fact having been accomplished by the computer 19 from information supplied to it. If flat, rather than arcuate, die boards are to be worked, motors 34 and 35 may instead be employed to traverse the drill lengthwise and widthwise, respectively, of the die board. Cutting rule 32 having tangs or legs 33 is mounted in the novel worked die board 30, as illustrated, thereby providing a novel rotary die unit ready for mounting upon a support, as a drum or shaft of a rotary die machine.

In FIGS. 7-13 is shown novel illustrative apparatus 40 for tape controlled drilling, routing, or combined drilling and routing, of rotary die boards forming the actuated component of the basic invention. The apparatus 40 includes spaced heavy end plate supports 42 and 43 which are maintained in opposed positions by a horizontal support 44 of inverted channel cross section, or any other desired cross section, by suitable bolts 45, welding or otherwise. A mounting bracket 46 is secured by machine screws to each end plate support 42 and 43 to which is secured a sturdy track 48 of square tubular cross section. The track 48 supports an axially traversible drill carriage 49 which includes a platform 50 to which are secured four corner depending legs 52. On each leg 52 is rotatively mounted a support roll bearing 53 rolling on the top of the track 48 and a side guide roll bearing 54 rolling against a side of the track 48. Also secured to the platform 50 are opposed elongated depending legs 56, each supporting a roll bearing 57 engaging the bottom of the track 48 to prevent lifting or torquing of the carriage 49.

A threaded shaft or lead screw 59 is rotatably mounted on top of the tract 48 by brackets 60 (FIGS. 7,8) and is threaded through a drive nut 61 secured to and depending from the platform 50 (FIGS. 12 and 13). A stepping motor 63 is mounted on a bracket 64 integral with the left hand brackets 60 (FIG. 8) and is connected to the shaft 59 for rotation thereof to move the carriage 49 axially.

A plate 66 having a flange 67 is mounted on the platform 50 for movement transversely of the tract 48, being secured in selected position by a machine screw 68 disposed through a slot 69 in the plate 66 (FIG. 12). Preferably, interengaging channel and rib in and on the platform 50 and plate 66 together with the screw 68 maintain the integrity of the plate 66. A drill head 70 is secured in firm operative position on the plate flange 67 by a bracket 71. The adjustment provided by the screw 68 and slot 69 permits proper positioning of the drill head 70 with respect to die boards of different diameters, as appears below.

In the drill head 70 is mounted a combination drill and router bit 73, the operating end of which includes a drill portion and a stepped-down router end or tip 75, by which alternate drilling and routing can be accomplished. It will be understood that the drill head 70 is an automatic unit which provides rotary motion to drive the bit 73 as well as the reciprocating motion to drill through a die board 30', retract to the specified depth for routing the slot between holes, and finally returning to its starting position upon completion of the hole pattern. The drill head 70 may be powered electrically, hydraulically or pneumatically, but it receives its signals to operate from the numerical control unit 23.

A shaft 80 parallel with the track 48 is rotatably mounted in aligned bearings 81 supported in end plate supports 42, 43. Die board mounting discs 83 are disposed on the shaft 80 for axial movement, being maintained against rotation by a key or spline 84 in a groove in the shaft 80. Setscrews 85 in hubs of the discs 83 are provided for securing the discs 83 in selected positions. The die board 30' of semicircular cross section is mounted on the discs 83 by screws 86.

A stepping motor 90 similar to motor 63 is mounted on a bracket 91 secured by bolts 92 to the end plate support 43. A worm 93 is rotatably mounted on the bracket 91 and secured to the rotor of the motor 90 for actuation. A worm gear 94 is secured to the shaft 80 and meshes with the worm 93. The motor 90 receives electric signals and power supply from the numerical control unit 23 (FIG. 17), and in accordance therewith rotates the shaft 80 and supported die board 30' clockwise or counterclockwise.

FIG. 17 is a wiring diagram showing the simple electrical connections between the numerical control unit 23 and the lead screw motor 63, the motor 70' of the drill head 70, and the shaft motor 90. The numerical control unit 23 is actuated by the tape 22 programmed as by perforations, or otherwise, to sequentially actuate the unit 23 to predeterminately energize the motors 63, 70' and 90 to drill and/or rout the programmed design on the die board 30' in the manner broadly set forth above. As noted above, the motors energized by unit 23, in the case of a flat die board may be energized to move the drill lengthwise and widthwise of the board; e.g., motors 63 and 90 respectively may move the drill along X and Y Cartesian coordinates, on the surface of the die board. Holes 97 and routing 98 result, which are adapted to receive cutting rule 32, and the like (FIGS. 5, 6, 15 and 16).

Manifestly, the design drilled or drilled and routed in the die board 30' can be repeated indefinitely on successive die boards or on the same die board where the basic design is small with substantially one hundred percent accuracy. Under the present method, tolerances can be held to +0.002 inch. This is an important advantage in die making. For example, it may be desirable to repeat the design a dozen times on the single die board 30', as for small cartons or boxes. It is essential that each die be the same size as the others, since blanks of varying sizes cut by the dies will cause jamming in the automatic machinery used to assemble the blanks.

The segments of cutting rule needed for mounting in the holes drilled as explained above are automatically produced in the correct number and length in the present invention. Referring to FIG. 3, it will be seen that one segment of cutting rule is required for insertion in the drilled holes between points A and B, another, longer segment is required between points B and C, and a third segment is required between points C and D, the last mentioned segment requiring a bend to fit the curve defined by the holes between points C and D. Information relating to the length and number of cutting rule segments may be fed to a computer which in turn emits a punched tape or the like, or such information relating to length and number of cutting rule segments may be derived by the computer from information relating to the required die design. A numerical control unit receives the punched tape or the like and translates the information thereon to the necessary electrical impulses to actuate electrical elements necessary to work a length of cutting rule blank (which may bear a knife edge or repetitive tang units or both) into cutting rule segments of the required length and number.

For example, (FIG. 19) a continuous length of cutting rule stock 110 having a continuous knife edge 112 is fed into a working machine designated generally as 114 in the direction shown by the arrow 116. The cutting rule is advanced as required through the machine by stepping motor 118 which in turn is powered by electrical impulses derived from the punched tapes by the numerical control unit. As the cutting rule stock is advanced through the machine, electric impulses from the numerical control unit activate metal working units exemplified as tang-cutting device 120, off-set cutting off device 122 and severing device 124, which devices are controlled by hydraulic system 126 connected to the numerical control device by lead 132. Stepping motor 128, controlled by the numerical control unit, serves to laterally position carriage 130 carrying the cutting devices so that the proper cutting device 120, 122 or 124 is brought into alignment with the cutting rule stock so the proper cutting action may be taken. Carriage 130, itself laterally properly positioned by stepping motor 128, is itself controlled to provide said cutting action by hydraulic system 126. Tang-cutting device 120 provides appropriately spaced tangs on the cutting rule stock. Severing device 124 severs segments of cutting rule after an appropriate length thereof has been advanced through the working machine by stepping motor 118.

Although segments of cutting rule normally are cut off squarely (as shwon by severed edge 140 in FIG. 5) by the severing device 124, it will be noted that the joint formed by abutting severed edges of cutting rule segments at a sharp angle of a design (e.g., point C of FIG. 3) may not present a continuous cutting edge to the material to be cut. This problem may be remedied by providing one of the abutting edges with an outwardly beveled knife edge section which snugly abuts the tapered knife edge of the adjoining edge. Referring to FIG. 18, the segment of cutting rule designed to run, for example, from point B to point C in FIG. 3 is designated 142 and the adjacent cutting rule segment (running from point D to point C and shown in cross-section) is designated 144, the segments having been seated in die board 30 with tangs 154 in holes 156. The joint between the segments is generally represented as 146. Segment 142 includes knife edge section 148 which is provided with an outwardly extending beveled portion 150 which snugly abuts the tapered knife-edge portion 152 of segment 144 so as to present a substantially continuous cutting edge to the workpiece to be cut. Off-set cutting off device 122, when positioned properly by stepping motor 128, imparts the outward, lateral beveled knife edge (FIG. 18 at 150) to the segment of cutting rule so severed. If desired, the offset cutting off device 122 and the severing device 130 may be combined into a single cutting off device, the type of cut made being governed by proper alignment of the device with respect to the cutting rule stock by means of stepping motor 128.

In the preferred embodiment, the information 18 relating to die design which is fed to computer 19 (FIG. 1) includes information relating to the required cutting rule segments (e.g., information from which the cutting rule segment information may be derived by the computer). The punched tape 22 or the like produced by the computer is received by the numerical control unit 23 which produces electrical impulses to activate the die-working means to provide spaced holes for reception of cutting rule segments and to activate means for producing the correspondingly required segments of cutting rule. The cutting rule segments may thus be produced simultaneously with production of the die design in the form of spaced holes. Since the means for producing cutting rule may be capable of operation at a different speed (e.g., faster) than the die-making means, it may be desirable to produce the cutting rule segments at a different time than the die board, and in this respect, a single machine for producing cutting rule may serve several die-making machines.

When the die board 30' is complete, it is removed from the discs 83, and the tangs 33 of cutting rule 32 (FIGS. 5 and 6), or the like, are forced into the holes 97 until the solid portion above the tangs 33 is snugly in routing 98 which is only 0.001 to 0.002 inch wider than the rule. Extreme accuracy is obtained in the die. Preferably, tangs 33 are rounded or chamfered at 99 for ease of entry into the holes 97.

It is clear that there have been provided a novel method of and novel means for making accurate dies, novel controlled apparatus for effecting drilling or drilling and routing of die boards, and novel rotary die boards with spaced holes, routing, etc., and novel rotary dies.

It is to be understood that the foregoing description and the accompanying drawings have been given by way of illustration and example. It is also to be understood that changes in form of the several parts, substitution of equivalent elements or steps, and rearrangement of parts of steps, which will be readily apparent to one skilled in the art, are contemplated as within the scope of the present invention, which is limited only by the claims which follow.

We claim:

1. A die assembly comprising a die board having round holes therein, the spacing and pattern of which define a preselected design, routing between said holes, and die rule having dependent tangs spaced along its length at locations to match at least some of the holes, said tangs being received in said holes and having portions with corners which engage the walls of said holes, said routing snugly receiving said die rule and accurately positioning the same.

2. The die assembly of claim 1 wherein the width of said routing in respect to the thickness of said rule is not greater than about 0.004 inches.

* * * * *